US009383595B2

United States Patent
El Gibari et al.

(10) Patent No.: US 9,383,595 B2
(45) Date of Patent: Jul. 5, 2016

(54) MICROWAVE FREQUENCY COMPONENT CONTROLLED BY A SYSTEM OF SHIELDED COPLANAR ELECTRODES, AND CORRESPONDING MANUFACTURING METHOD

(71) Applicant: Universite De Nantes, Nantes (FR)

(72) Inventors: Mohammed El Gibari, Sainte-Luce-sur-Loire (FR); Serge Toutain, Nantes (FR); Hongwu Li, Carquefou (FR); Cyril Lupi, Nantes (FR); Dominique Averty, Saint-Luce-sur-Loire (FR)

(73) Assignee: UNIVERSITE DE NANTES, Nantes (FR)

( * ) Notice: Subject to any disclaimer, the term of this patent is extended or adjusted under 35 U.S.C. 154(b) by 0 days.

(21) Appl. No.: 14/407,889

(22) PCT Filed: Jun. 13, 2013

(86) PCT No.: PCT/EP2013/062284
§ 371 (c)(1),
(2) Date: Dec. 12, 2014

(87) PCT Pub. No.: WO2013/186316
PCT Pub. Date: Dec. 19, 2013

(65) Prior Publication Data
US 2015/0125107 A1 May 7, 2015

(30) Foreign Application Priority Data
Jun. 13, 2012 (FR) .................................... 12 55545

(51) Int. Cl.
G02F 1/035 (2006.01)
G02F 1/01 (2006.01)
G02F 1/065 (2006.01)

(52) U.S. Cl.
CPC ............. *G02F 1/011* (2013.01); *G02F 1/0356* (2013.01); *G02F 1/065* (2013.01); *G02F 2201/121* (2013.01)

(58) Field of Classification Search
CPC ........ G02F 1/011; G02F 1/065; G02F 1/0356
USPC .......................................................... 385/1–3
See application file for complete search history.

(56) References Cited

U.S. PATENT DOCUMENTS

| 5,455,876 | A | * | 10/1995 | Hopfer et al. ..................... 385/2 |
| 5,991,491 | A | | 11/1999 | Madabhushi |
| 2004/0066549 | A1 | * | 4/2004 | Kiehne et al. ................. 359/254 |

FOREIGN PATENT DOCUMENTS

| EP | 1079257 A2 | 2/2001 |
| EP | 1176455 A1 | 1/2002 |
| EP | 2006723 A1 | 12/2008 |
| JP | 2004334098 A | 11/2004 |

OTHER PUBLICATIONS

El-Gibari et al., "Ultra-Wideband GCPW-MS Transitions for Characterizing Microwave and Photonic Components Based on Thin Polymer", Electronic Letters, the Institution of Engineering and Technology, vol. 47, No. 9, Apr. 28, 2011, pp. 553-555, XP006038796.

(Continued)

*Primary Examiner* — Ryan Lepisto
(74) *Attorney, Agent, or Firm* — David D. Brush; Westman, Champlin & Koehler, P.A.

(57) ABSTRACT

A microwave frequency component includes a thin layer of dielectric material arranged between an earth electrode and a control electrode controlling a microwave frequency electrical signal such that the earth electrode extends over a first face, called the lower face, of the thin layer of dielectric material, and the control electrode extends longitudinally over a second face, called the upper face, of the thin layer of dielectric material. The microwave frequency component is such that it includes a set of at least two shielded coplanar electrodes extending along the entire length of the control electrode, to each side of and at an equal distance from the control electrode.

17 Claims, 4 Drawing Sheets

(56) References Cited

OTHER PUBLICATIONS

El-Gibari et al., "Ultra-Wideband GCPW-MS-GCPW Driven Electrode for Low-Cost and Wide Range Application Electro-Optic Modulators", Microwave and Optical Technology Letters, vol. 52, nop. 5, May 2010, pp. 1078-1082, XP002696442.

International Preliminary Report on Patentability and English translation of the Written Opinion dated Dec. 16, 2014 for corresponding International Application No. PCT/EP2013/062284, filed Jun. 13, 2013.

International Search Report dated Aug. 22, 2013 for corresponding International Application No. PCT/EP2013/062284, filed Jun. 13, 2013.

French Search Report and Written Opinion dated May 2, 2013 for corresponding French Application No. 1255545, filed Jun. 13, 2012.

* cited by examiner

MICROWAVE FREQUENCY COMPONENT CONTROLLED BY A SYSTEM OF SHIELDED COPLANAR ELECTRODES, AND CORRESPONDING MANUFACTURING METHOD

1. CROSS-REFERENCE TO RELATED APPLICATIONS

This application is a Section 371 National Stage Application of International Application No. PCT/EP2013/062284, filed Jun. 13, 2013, the content of which is incorporated herein by reference in its entirety, and published as WO 2013/186316 A1 on Dec. 19, 2013, not in English.

2. FIELD OF THE INVENTION

The field of the invention is that of microwave frequency components.

More specifically, the invention pertains to the designing of a thin-film microwave frequency component controlled by a control electrode, and especially by a microstrip type electrode.

The term "thin layer" here below in the document refers to a layer of material, the thickness of which is generally below 100 µm, as opposed to "thick layers", the thickness of which is generally above 100 µm.

The invention can be applied especially but not exclusively to applications and components such as for example: electro-optical modulators, electro-optical switches, wide bandwidth photon antennas, analog-digital converters of microwave frequency signals by optical means, resonators and tunable filters.

3. TECHNOLOGICAL BACKGROUND

We shall strive more particularly here below in the invention to describe the problems and issues existing in the context of high-broadband electro-optical modulators that have been faced by the inventors of the present patent application. The invention is naturally not limited to this particular field of application but is of interest for any microwave frequency component that has to cope with proximate or similar problems and issues.

Opto-microwave components have in recent years prompted an increasing interest in communications networks requiring wide bandwidths. Indeed, to meet a growing need on the part of users for applications requiring wide bandwidths, communications networks require the use of electro-optical modulation components to transcribe the microwave frequency electrical signals to be transmitted into optical signals. These components have numerous advantages, providing immunity against electromagnetic disturbances, low signal losses, wide bandwidths and low consumption.

Thus, at a time when optics are penetrating high-bit-rate access networks, it appears to be worthwhile to be able to have available high-performance low-cost electro-optical modulators having high integration.

Figure 1:
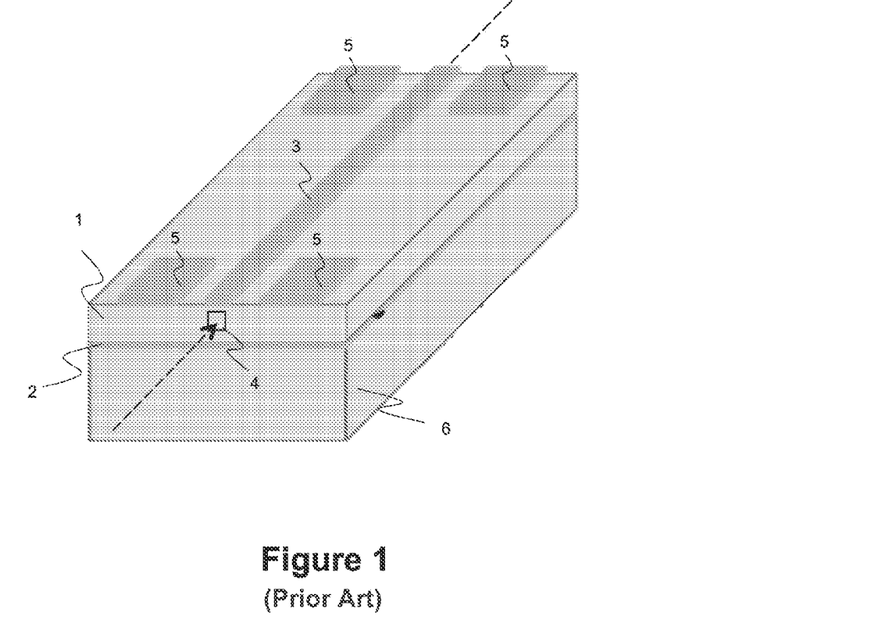
FIG. 1, already described with reference to the prior art, presents the structure of an electro-optical modulation component known in the prior art.

Conventionally, an electro-optical modulator comprises, as illustrated in FIG. 1, a thin layer of dielectric material 1 included between a ground plane 2 (also called a ground electrode) and a microstrip control electrode 3 (also commonly called a microstrip line). The thin layer 1 includes an optical waveguide formed out of electro-optical material 4 disposed so as to guide a light signal to be modulated from an input point up to an output point of the modulator. The microstrip line 3 placed on the upper face of the thin layer 1 and parallel to the optical guide 4 enables the application of an electrical microwave frequency modulation signal intended to modulate the light signal passing through the optical waveguide 4. A phase and/or amplitude modulation of the light signal can be obtained by electro-optical effect. The thin layer 1, based on organic polymers for example, comprises pre-oriented chromophores. The electrical field created inside the electro-optical material 4 by the voltage applied across the control electrode 3 and the ground plane 2 locally modifies the refraction index of the electro-optical material via the electro-optical effect sought.

However, electro-optical modulators made out of thin layers are facing a certain number of obstacles to their technological development.

When an electro-optical modulator has to be connected to a coaxial connector, it is necessary for the outer radius of the conductor of the connector to be of the same magnitude as the thickness of the layer of material forming the substrate 1. Now, owing to the dimensional mismatch between the thin layer 1 (typically of the order of 10 µm) and the conductor of the coaxial connector (typically of the order of several hundreds of micrometers or even several millimeters), a direct connection of the electro-optical modulator with the coaxial connector is ruled out.

In order to avoid any problem of dimensional mismatch and to facilitate the opto-microwave frequency characterizations of the modulators in the non-connected state, classically a probe with coplanar tips (of the GSG or Ground Signal Ground) type is used, requiring the integration of contact pins 5 on the thin layer of the electro-optical material. These contact pins 5 are disposed on either side of the control electrode at input and output of the modulator, as illustrated in FIG. 1.

To convey the electrical modulation signal via the control electrode 3 and the ground pins 5 and apply it to the electro-optical material as efficiently as possible, it is appropriate to have available transitions providing for a virtual electrical contact between the pins 5 and the ground plane 2, by electromagnetic coupling using the capacitive effect between them.

In the prior art, there are different known types of transition in order to improve the electrical bandwidth of an electro-optical modulator In a first method, metalized holes are introduced into the dielectric substrate, between the ground plane and the contact pins, in order to provide for physical contact between the lower ground plane 2 and the upper ground plane 5. However, this prior-art method is complex in its implementation and unsuited to the making of thin-layer components, especially when the polymer is reticulate. Even when such a method was adopted for making thin-layer microwave frequency components, the presence of metalized holes within the propagation structure generated electromagnetic disturbances, greatly limiting the electrical bandwidth of the component.

Figure 2:
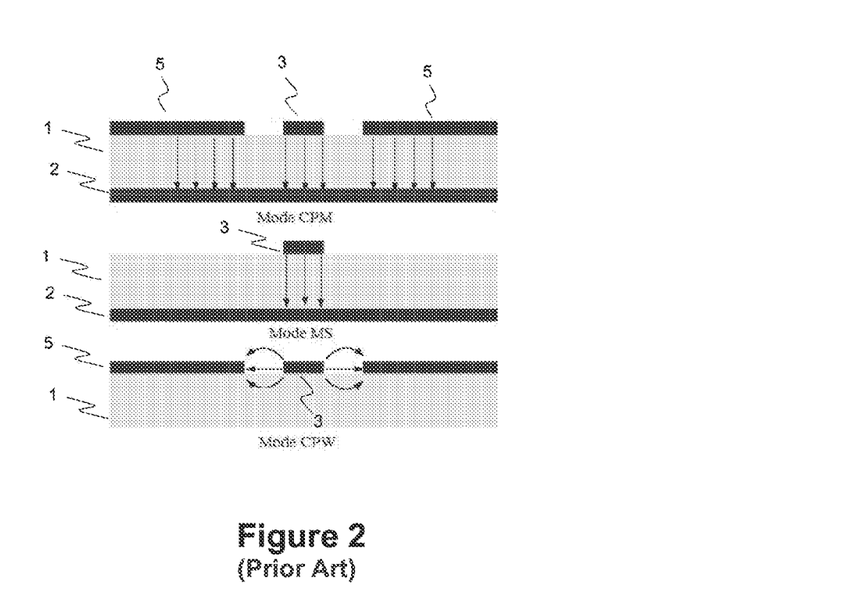
FIG. 2, already described with reference to the prior art, presents three configurations of modes of electromagnetic fields getting propagated in the electro-optical modulator of FIG. 1.

A second known method relies on the making of transitions between microstrip lines and coplanar pins by electromagnetic coupling between the lower ground plane and the upper ground planes. In such a structure, when a microwave frequency modulation signal is applied between the contact pins and the control electrode, three modes of electromagnetic propagation can be propagated within the electro-optical material. These three modes of propagation are illustrated in greater detail in FIG. 2: the microstrip mode (denoted MS in the figure), the coplanar mode (denoted as CPW for coplanar waveguide) and the coplanar microstrip mode (denoted as CPM). It has been shown that the use of contact pins in a microstrip type propagation structure greatly excites the CPM propagation mode, which causes the appearance of resonance spikes that limit the electrical bandwidth of the component. In addition, such a method does not ensure the passage of direct current.

4. SUMMARY OF THE INVENTION

One particular embodiment of the invention proposes a microwave frequency component comprising a layer of dielectric material, formed by at least one thin layer, laid out between a ground electrode and a control electrode for controlling a microwave frequency electrical signal, such that:
  the ground electrode extends on a first face, called a lower face, of the layer of dielectric material,
  the control electrode extends longitudinally on a second face, called an upper face, of the layer of dielectric material,
the component being such that it comprises a set of at least two coplanar electrodes extending all along the control electrode on either side of and at equal distance from the control electrode.

Thus, by having such a layout of coplanar electrodes on the layer of dielectric material formed by at least one thin layer, the inventors have observed that a microwave frequency electrical signal applied to the microwave frequency component induces an electromagnetic field in the thin layer that is confined beneath and throughout the length of the control electrode. It has indeed been observed that by combining the characteristics specific to the thin layers and the use of above-defined coplanar electrodes, called "shielded" coplanar electrodes, the mode of electromagnetic propagation imposed within the dielectric material is the one associated with the control electrode sought. This means that electrical continuity between the coplanar electrodes and the control electrode is ensured at the same time as a wide bandwidth. The shielded coplanar electrodes can be used to ensure the function of the control electrode. In other words, according to the invention, the shielded coplanar electrode behaves like a control electrode.

The term "shielded" means that the coplanar electrodes are associated with the ground electrode of the component, in other words that the coplanar electrodes have lower ground planes.

Thus, unlike in the prior-art microwave frequency propagation structure, the microwave frequency component of the invention makes it possible firstly to ensure the continuity of the electrical signal, especially at low frequency, and secondly to remove the phenomenon of electromagnetic disturbance due to the presence of the contact pins. This is all the more surprising as, for those skilled in the art, the fact of using coplanar electrodes extending throughout the length of the control electrode should have increased this phenomenon of electrical disturbance by excitation of higher-order modes.

Besides, the bandwidths observed by the transitions between the coplanar electrodes and the control electrode in the context of the invention make it possible to envisage industrial-scale applications for the use of such a thin-layer microwave frequency component.

Finally, the fact of equipping a microwave frequency component with such a layout of coplanar electrodes makes it possible to obtain a thin-layer microwave frequency component having an extended electrical bandwidth, simply and at low cost In a particularly advantageous way, the control electrode is a microstrip type electrode.

The microstrip electrode, sometimes called a microstrip line, is particularly simple and costs little to implement. The shielded coplanar electrodes can therefore be used to fulfill the functions of a microstrip electrode. In other words, the shielded coplanar electrode according to the invention behaves appreciably like a microstrip electrode.

According to one advantageous characteristic, the distance G between the control electrode and each of said coplanar electrodes and the thickness h of the layer of dielectric material will satisfy the following inequality: $1.2 \leq G/h < 2$.

By taking advantage of the specific characteristics of the thin layers, the conversion of the magnetic field between the coplanar mode and the microstrip mode is further facilitated. This dictates a confinement of the electromagnetic field in the dielectric material localized beneath the microstrip electrode.

In a particularly advantageous way, the control electrode has a width W that satisfies the following expression: $W = 2.5 * h - 2$.

In a particularly advantageous way, the distance G between the control electrode of each of said coplanar electrodes satisfies the following expression: $G = 1.4 * h - 1$.

The width W and the distance G are determined so as to obtain a characteristic input or output impedance mismatching of the component of the order of 50 $\Omega$.

In a particularly advantageous way, the coplanar electrodes each have a width $W_g$ below 5 mm, preferably below 2 mm, and more preferably below 500 µm.

In a particularly advantageous way, the layer of dielectric material has a thickness h below 100 µm, preferably below 50 µm, and more preferably below 20 µm.

Preferably, the dielectric material has a dielectric constant below 7, preferably below 5 and more preferably below 3.

In a particularly advantageous way, the dielectric material is a material with electro-optical effect belonging to the group comprising: semi-conductor material, inorganic material, organic material, hybrid organic-inorganic material.

The invention can therefore be applied more specifically to components having opto-electrical functions.

The electrical field created within the electro-optical material by means of said at least two coplanar electrodes imposes a variation of optical refraction index so as to generate efficient a targeted electro-optical modulation beneath the control electrode.

According to one advantageous characteristic, the layer of dielectric material comprises a buried optical waveguide.

In a particularly advantageous way, the buried optical waveguide extends in parallel to the control electrode.

It is therefore possible to implement an electro-optical modulation of a light ray getting propagated within the waveguide.

Another particular embodiment of the invention proposes a method for manufacturing a microwave frequency component comprising the following steps:
  depositing a layer of an electrical conductive material on a substrate wafer;
  depositing a layer of dielectric material, formed by at least one thin layer, on said layer of electrical conductive material;
  obtaining, on said layer of dielectric material:
    a control electrode which extends longitudinally on the layer of the dielectric material, and
    a set of at least two coplanar electrodes extending along the control electrode on either side and at equal distance from the control electrode.

For example, the manufacture of an electro-optical modulation component can require the depositing of three successive thin layers of dielectric materials, a first layer to constitute the layer called the buffer of the optical sheath, the second to constitute the layer called an optical waveguide (or core), the third to constitute the layer called the optical sheath overlapping layer.

The step for obtaining a control electrode and at least two coplanar electrodes can be achieved:

- by a technique combining a vacuum deposition of the electrical conductive material by thermal vapor deposition or cathode spray deposition, a deposition of photosensitive resin, a step of insolation and development of the resin followed by a chemical or ion etching of the electrical material (known as the "Lift-On" method), or
- by a technique combining a deposition of photosensitive resin, a step of insolation and development of the resin followed by a vacuum deposition of the electrical conducting material by thermal evaporation or cathode spraying. The final structure will be obtained during the withdrawal of all the resin (known as the "Lift-Off" method).

5. LIST OF FIGURES

Other features and advantages of the invention shall appear from the following description, given by way of a non-exhaustive and indicative example and from the appended drawings, of which.

6. DETAILED DESCRIPTION

In all the figures of the present document, the identical elements and steps are designated by a same numerical reference.

As described here above, the principle of the invention relies on the ingenious use of a set of at least two coplanar electrodes disposed on either side and at equal distance from a control electrode, of a microstrip type for example, of a thin-layer microwave frequency component and extending all along this control electrode to fulfill the function of the control electrode.

Figure 3:
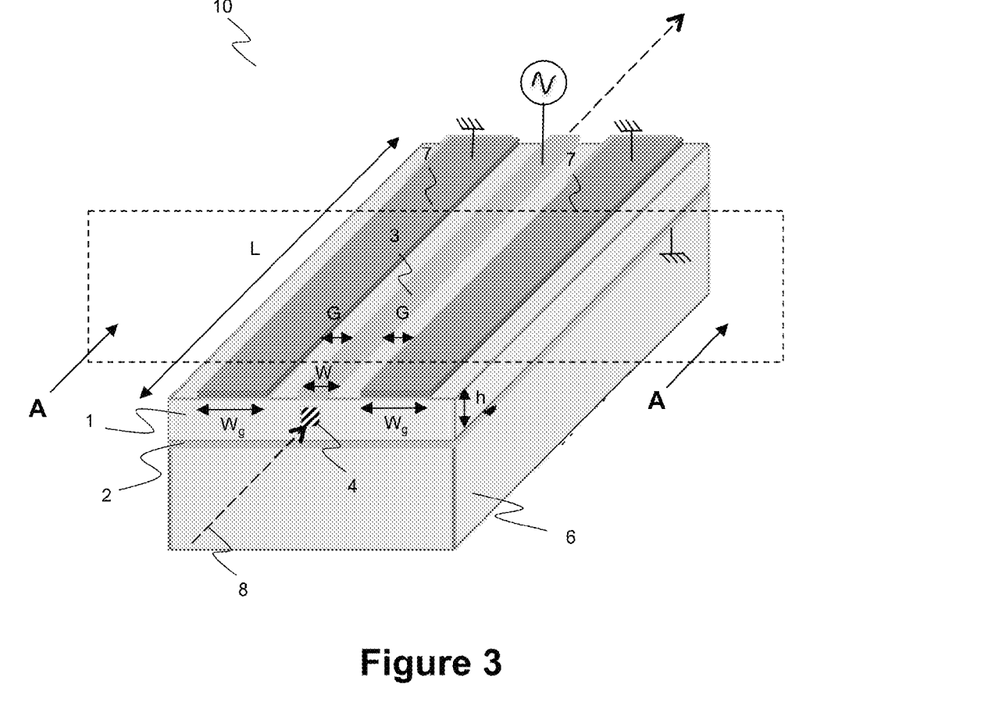
FIG. 3 presents an example of a structure of a microwave frequency component according to one particular embodiment of the invention.

FIG. 3 presents an example of a structure of a microwave frequency component 10 according to one particular embodiment of the invention.

The microwave frequency component 10 represented in this figure is a polymer-based electro-optical modulation component. It comprises more particularly:

- a silicon substrate 6;
- a ground electrode or lower metallic ground plane 2 placed on the entire surface of the substrate 6;
- a thin layer 1 of dielectric material such as a BCB (benzocyclobutene) type polymer material for example, placed on the entire surface of the ground electrode 2;
- a buried optical waveguide 4 to guide an optical signal 8 to be modulated from an input point to an output point of the modulator (transcription of the microwave frequency signals into optical signals);
- a central control electrode 3 of a microstrip type (also called a microstrip line) extending on a part of the width of the upper face of the thin layer 1 and throughout the length of the optical waveguide 4;
- a set of two coplanar electrodes 7 (also called coplanar lines) disposed on either side of and at equal distance from the control electrode 3 and extending all along this electrode 3. The two coplanar electrodes 7 play the role of upper ground planes.

In this example, the thin layer 1 fulfils the function of an electrical waveguide and has a thickness h of the order of 20 µm and relative permittivity $\in_r$ of the order of 2.9. The microstrip electrode 3 has a width W of the order of 52 µm and a length of the order of 1 cm. Each coplanar electrode 7 has a width $W_g$ of the order of 1 mm and a length of 1 cm. The distance G between the microstrip electrode 3 and each of the two coplanar electrodes 7 (here below called "inter-electrode distance") is equal to 33 µm.

It must be noted that these dimensions are given purely by way of an illustration and can of course be different.

The layer 1 of dielectric material illustrated here can be constituted in practice by one or more successive thin layers. In the present case, the layer 1 of dielectric material is formed by three thin layers of dielectric materials: a first layer (commonly called a "buffer") forming a part of the optical sheath, the second intended to be the buried optical waveguide, the third (commonly called an overlapping layer) forming the other part of the optical sheath. For the simplicity of the description, the term "thin layer" will be loosely applied to a set of thin layers constituting the layer of dielectric material 1.

In general, the dimensions of the coplanar electrodes 7 and their layout relative to the microstrip electrode 3 can be optimized so that the electro-optical modulator can benefit from a very wide electrical bandwidth.

According to one particular embodiment, the inter-electrode distance G and the thickness h of the thin layer 1 are determined so as to satisfy the following inequality:

$$1.2 \leq G/h < 2 \quad (1)$$

This empirical inequality can be used to obtain an electro-optical modulator controlled by a set of lower ground plane coplanar electrodes and having a wide bandwidth. Indeed, in the context of experiments performed on thin-layer microwave frequency structures, the inventors have shown that, when the ratio between the inter-electrode distance G and the thickness h of the thin layer 1 belongs to the above range of values (1), the excitation of the MS propagation mode is favored at the core of the thin layer 1 and the electromagnetic field is then confined chiefly beneath the microstrip electrode 3, ensuring optimum efficiency of electro-optical interaction at the optical waveguide 4.

Figure 4:
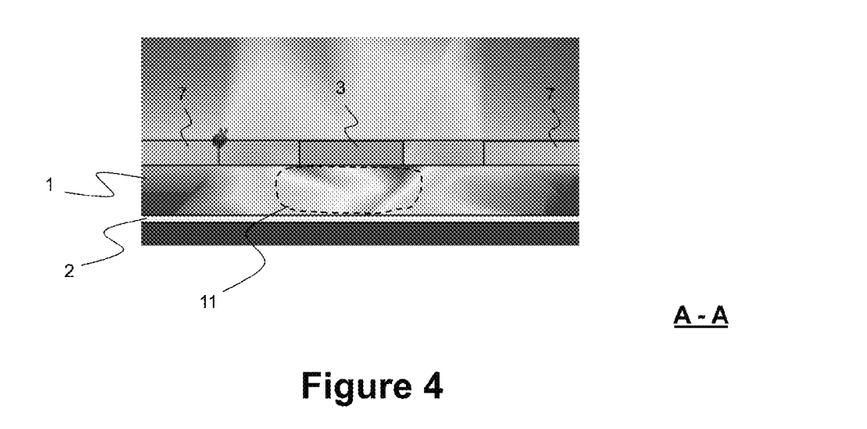
FIG. 4 is a simulation of the distribution of the electromagnetic field appearing in the transverse plane A-A of the microwave frequency component illustrated in FIG. 3.

This physical phenomenon is particularly well illustrated in FIG. 4 which shows the distribution of the electromagnetic field appearing in the transverse plane A-A of the modular 10 in the form of a simulation. Indeed, this figure shows, especially in the zone within dashes referenced 11, that the major part of the electromagnetic field induced in the thin layer 1 is confined beneath the microstrip line 3. The mode of propagation perceives the portion of the ground electrode 2 corresponding to the ground plane of the microstrip electrode, facilitating the coplanar/microstrip conversion of the electromagnetic. In other words, this figure clearly shows the confinement of the energy beneath the central microstrip line 3, thus showing the propagation of the desired microstrip mode.

The CPM propagation mode highly present in the electro-optical modulators of the prior art is no longer excited in the modulator of the invention. The use of a set of coplanar electrodes with lower ground plane and a thin-layer propagation structure inhibits the undesired effects of excitation of the CPM propagation mode: the function of a microstrip line with increased bandwidth can therefore be ensured. An example of electrical characteristics obtained with the microwave frequency component according to the invention is presented further below with reference to FIGS. 6a and 6b.

The conditions to be met to make an electro-optical modulator benefiting from a wide electrical bandwidth according to the invention can be summarized as follows.

First of all, the width W of the microstrip electrode is determined in order to have a characteristic impedance matching of the order of 50Ω (with a generator at input or with a load at output), or the basis of the following relationship: $W=2.5*h-2$. This relationship makes it possible to fix a width W optimizing the transfer of energy with the microstrip electrode.

Then, the inter-electrode distance G is determined from the following relationship: $G=1.4*h-1$, while satisfying the inequality (1) described here above.

It must be noted that the geometrical dimensions of the component, such as the width W and the distance G, are characteristics that those skilled in the art are capable of defining as a function of the desired characteristic impedance value.

Then the width $W_g$ of the two coplanar electrodes is fixed by considering that they must be less than 2 mm ($W_g \leq 2$ mm). Indeed, it has been observed that the bandwidth is all the larger as the width $W_g$ of the coplanar electrodes is small.

The relative permittivity, also called the dielectric constant, of the electro-optical material $\in_r$ is also a parameter to be considered, the bandwidth being all the wider as the value of the relative permittivity is low. Thus, the relative permittivity is set at less than ($\in_r < 7$).

The length L of the microstrip electrodes 3 and coplanar electrodes 7 is then defined so as to correspond to the length of interaction of the electrical wave with the optical wave of the modulator.

The microwave frequency component can then be connected to a classic coaxial connector. As illustrated in FIG. 3, the ground plane 2 and the coplanar electrodes 7 are intended to be connected to the electrical ground. The microstrip control electrode 3 for its part is intended for application to an electrical microwave frequency modulation signal. It may be recalled that this microwave frequency signal is used to modulate the light signal passing through the optical waveguide 4. Such an arrangement of the shielded coplanar electrodes with the microstrip control electrode can thus ensure the functions of the control electrode with an increased bandwidth.

Figure 5A:
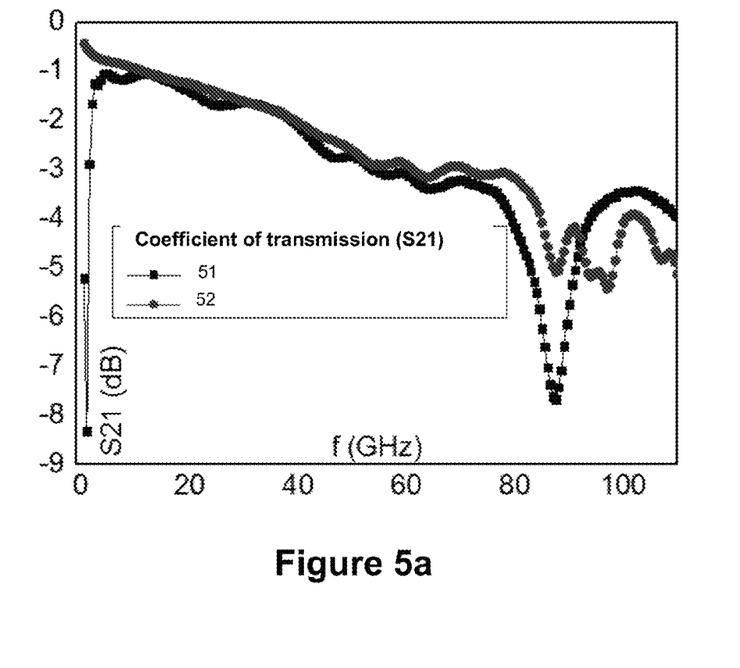
FIGS. 5a and 5b graphically represent the progress of the experimental coefficients of transmission and reflection of a microwave frequency component obtained according to a first example according to the invention on the one hand and a microwave frequency component known in the prior art on the other hand.
Figure 5B:
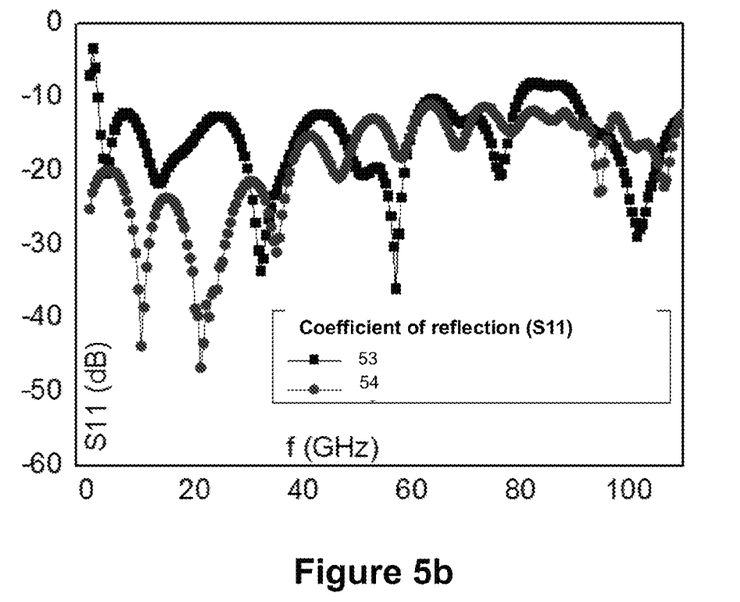

FIGS. 5a and 5b graphically represents the progress of the transmission coefficients S21 and reflection coefficients S11 measured for a microwave frequency component according to a first example according to the invention on the one hand and for a known microwave frequency component of the prior art on the other hand.

The structural dimensions of these two structures are of the order of: W=48 μm, G=28 μm, $W_g$=1 mm, h=20 μm and L=1 cm. The structures are made on a BCB ($\in_r$=2.9) polymer.

In general, the coefficient of transmission S21 and reflection S11 reflect the behavior at transmission and reflection of the waves being propagated in a propagation structure.

In FIG. 5a, the curves referenced 51 and 52 correspond to the progress of the coefficient of transmission S21 measured respectively for the known microwave frequency component presented further above with reference to the prior art and for a microwave frequency component according to the invention. The curves 51 and 52 are represented on a frequency band of 0 to 110 GHz. The excitation of the CPM mode of propagation is the source of the resonance spike which appears on the curve 51 at around 88 GHz for the known microwave frequency component of the prior art. Unlike this component, the microwave frequency component made in the framework of the invention has a far smaller resonance spike, whence an increase of the bandwidth. Furthermore, it is seen on this graph that the bottom limit of the bandwidth (cut-off frequency) appears in the range of 5 GHz for the curve 51 whereas that of the curve 52 is not seen. Hence, continuity is observed in the electrical signal in the low frequencies.

In FIG. 5, the curves referenced 53 and 54 correspond to the progress of the coefficient of reflection S11 obtained respectively for the prior-art component and by a microwave frequency component according to the invention for a frequency band of 0 to 110 GHz. It may be recalled in this respect that the quality of matching of the antenna in bandwidth depends on the level of the coefficient of reflection. This graph shows that the level of the coefficient of reflection S11 of the curve 54 is lower than −10 dB starting with the lower frequencies and is on the whole situated beneath the curve 53. This means that the component according to the invention on the whole has good matching on a frequency band of 1 to 110 GHz.

Figure 6A:
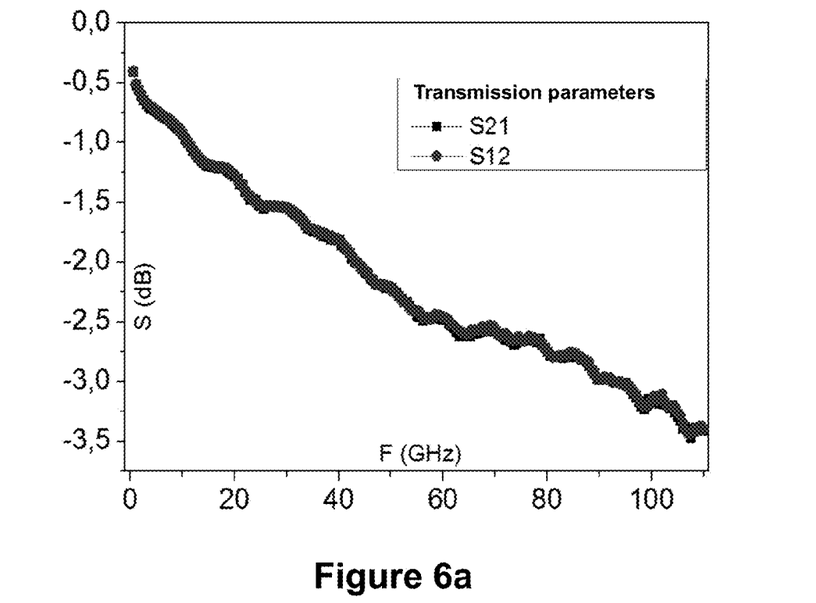
FIGS. 6a and 6b graphically represent the progress of the experimental coefficients of transmission and reflection of a microwave frequency component obtained according to a second example according to the invention.
Figure 6B:
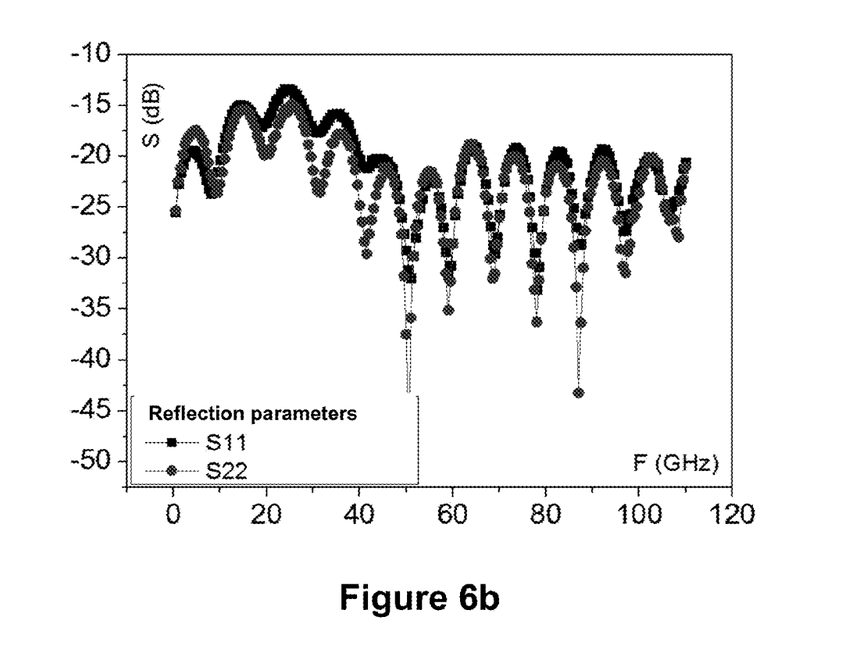

FIGS. 6a and 6b graphically represent the progress of the coefficients of transmission (S21, S12) and of reflection (S11, S22) measured for a microwave frequency component according to the second example of the invention.

The structural dimensions chosen in this example are those described here above with reference to FIG. 3.

In FIG. 6a, it is also observed that these two curves do not show any discontinuity in the low frequencies and no resonance spike, unlike in the prior art. The inventors have shown that the disappearance of the lower limit of the bandwidth is related to the presence of coplanar electrodes. Indeed, the layout of the coplanar electrodes combined with the characteristics of the thin layer 1 of the electro-optical material make it possible to stretch the capacitive effect towards infinity between the upper ground plane 7 and lower ground plane 2. In addition, they make it possible to overcome the effects of the losses related to the appearance of the resonance spikes limiting the bandwidth. The experimental bandwidth obtained here for the microwave frequency component is greater than 90 GHz.

FIG. 6b shows very efficient matching for the coefficients of reflection S11 and S22, these coefficients being lower than −15 dB on the entire frequency band studied, thus enabling optimal transfer of electrical energy.

Finally, here below we describe the main steps of the method for manufacturing a microwave frequency component according to a particular embodiment of the invention. First of all, a metal layer constituting a ground electrode is deposited on a substrate wafer (a silicon wafer for example). This deposition can be done typically by means of a vacuum vapor deposition technique. Then, by spin-coating, for example, a thin layer of dielectric material with electro-optical effect is deposited for example on the ground electrode. This layer of dielectric material is formed more specifically by three thin layers: a first layer forming a part of the optical sheath, a second layer which, after etching, is used to form the buried optical waveguide and a third layer forming the other part of the optical sheath. Finally, the following are made on the layer of dielectric material (i.e. the layer constituting the optical sheath):
- a control electrode which extends longitudinally on the layer of dielectric material, and
- two coplanar electrodes, extending along the control electrode on either side, and at equal distance from the control electrode.

This last step can be carried out by means of a technique of vacuum vapor deposition followed by a chemical etching. Other techniques for making coplanar electrodes and the control electrode are of course possible without departing from the framework of the invention.

The microwave frequency component described here above is intended for electro-optical integrated circuits. It is clear however that it can be easily adapted to numerous other applications without departing from the framework of the invention. In particular, the microwave frequency component of the invention can be adapted to electronic integrated circuits that do not comprise any optical waveguide but only an electrical waveguide (dielectric thin layer). The invention can indeed be applied independently of the fact that the thin layer of dielectric material is intended or not intended for the transcription of microwave frequency electrical signals to be transmitted into optical signals. More generally, the invention can be applied to any component comprising a layer of dielectric material formed by at least one thin layer and controlled by a control electrode for controlling a microwave frequency electrical signal.

An exemplary embodiment provides a technique for obtaining a thin-layer microwave frequency component that has a wide electrical bandwidth.

An exemplary embodiment provides a microwave frequency component that complies with the conditions of impedance matching.

An exemplary embodiment provides a technique of this kind that is simple and costs little to implement.

Although the present disclosure has been described with reference to one or more examples, workers skilled in the art will recognize that changes may be made in form and detail without departing from the scope of the disclosure and/or the appended claims.

The invention claimed is:

1. A microwave frequency component comprising:
    a layer of dielectric material, formed by at least one thin layer, laid out between a ground electrode and a control electrode for controlling a microwave frequency electrical signal, such that:
    the ground electrode extends on a first face, called a lower face, of the layer of dielectric material,
    the control electrode extends longitudinally on a second face, called an upper face, of the layer of dielectric material; and
    a set of at least two coplanar electrodes extending all along the control electrode on either side of and at equal distance from the control electrode,
    wherein a distance G between the control electrode and each of said coplanar electrodes and a thickness h of the layer of dielectric material satisfy the following inequality: $1.2 \leq G/h < 2$.

2. The microwave frequency component according to claim 1, wherein the control electrode is a microstrip type electrode.

3. The microwave frequency component according to claim 1, wherein the control electrode has a width W that satisfies the following expression: $W = 2.5*h - 2$.

4. The microwave frequency component according to claim 3, wherein the distance G between the control electrode of each of said coplanar electrodes satisfies the following expression: $G = 1.4*h - 1$.

5. The microwave frequency component according to claim 1, wherein the coplanar electrodes each have a width $W_g$ below 5 mm.

6. The microwave frequency component according to claim 5, wherein the width $W_g$ is below 2 mm.

7. The microwave frequency component according to claim 6, wherein the width $W_g$ is below 500 μm.

8. The microwave frequency component according to claim 1, wherein the layer of dielectric material has a thickness h below 100 μm.

9. The microwave frequency component according to claim 8, wherein the thickness h is below 50 μm.

10. The microwave frequency component according to claim 9, wherein the thickness h is below 20 μm.

11. The microwave frequency component according to claim 1, wherein the dielectric material has a dielectric constant below 7.

12. The microwave frequency component according to claim 1, wherein the dielectric material is a material with electro-optical effect belonging to the group consisting of: semi-conductor material, inorganic material, organic material, hybrid organic-inorganic material.

13. The microwave frequency component according to claim 12, wherein the layer of dielectric material comprises a buried optical waveguide.

14. The microwave frequency component according to claim 13, wherein the buried optical waveguide extends in parallel to the control electrode.

15. The microwave frequency component according to claim 1, wherein the dielectric material has a dielectric constant below 5.

16. The microwave frequency component according to claim 1, wherein the dielectric material has a dielectric constant below 3.

17. A method for manufacturing a microwave frequency component comprising the following steps:
    depositing a layer of an electrical conductive material on a substrate wafer;
    depositing a layer of dielectric material, formed by at least one thin layer, on said layer of electrical conductive material;
    obtaining, on said layer of dielectric material:
        a control electrode which extends longitudinally on the layer of the dielectric material, and
        a set of at least two coplanar electrodes extending all along the control electrode on either side and at equal distance from the control electrode,
    wherein a distance G between the control electrode and each of said coplanar electrodes and a thickness h of the layer of dielectric material satisfy the following inequality: $1.2 \leq G/h < 2$.

* * * * *